US010253870B2

(12) United States Patent
Niwa et al.

(10) Patent No.: US 10,253,870 B2
(45) Date of Patent: Apr. 9, 2019

(54) SHIFT DEVICE

(71) Applicant: KABUSHIKI KAISHA TOKAI-RIKA-DENKI-SEISAKUSHO, Aichi-ken (JP)

(72) Inventors: Takehiro Niwa, Aichi-ken (JP); Yohei Nakano, Aichi-ken (JP); Naomi Asahina, Aichi-ken (JP)

(73) Assignee: KABUSHIKI KAISHA TOKAI-RIKA-DENKI-DEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/657,744

(22) Filed: Jul. 24, 2017

(65) Prior Publication Data

US 2018/0031117 A1    Feb. 1, 2018

(30) Foreign Application Priority Data

Jul. 28, 2016  (JP) ................. 2016-148380

(51) Int. Cl.
*F16H 59/00*  (2006.01)
*F16H 59/10*  (2006.01)
(Continued)

(52) U.S. Cl.
CPC ......... *F16H 59/105* (2013.01); *F16H 59/044* (2013.01); *F16H 61/24* (2013.01);
(Continued)

(58) Field of Classification Search
CPC ... F16H 59/105; F16H 61/24; F16H 2061/247
See application file for complete search history.

(56) References Cited

U.S. PATENT DOCUMENTS 4,519,266 A    5/1985  Reinecke
4,912,997 A *  4/1990  Malcolm ............... F16H 59/044
                                                         338/128
(Continued)

FOREIGN PATENT DOCUMENTS

DE    102006028228 A1    12/2006
EP        0075693 A1      4/1983
(Continued)

OTHER PUBLICATIONS

Extended European Search Report issued in the corresponding EP application No. 17183197.7 dated Jan. 10, 2018.
(Continued)

*Primary Examiner* — Victor L MacArthur
(74) *Attorney, Agent, or Firm* — Roberts Mlotkowski Safran Cole & Calderson, P.C.

(57) ABSTRACT

In a shift lever device, a gate pin of a lever is guided by a gate groove of a gate plate, and a detent pin of the lever is abutted on a detent face of a detent block due to an urging force. A sensor mechanism detects a shift position of the lever. The gate plate, the detent block, and the sensor mechanism are disposed at a lower side of the lever, the gate plate and the detent block are disposed at a rear side of the lever, and the sensor mechanism is disposed at a front side of the gate plate and the detent block. This thereby enables a reduction in size of the shift lever device in an up-down direction.

2 Claims, 6 Drawing Sheets

(51) Int. Cl.
*F16H 61/24* (2006.01)
*F16H 59/04* (2006.01)
*F16H 59/02* (2006.01)

(52) U.S. Cl.
CPC ............... *F16H 2059/0269* (2013.01); *F16H 2059/0295* (2013.01); *F16H 2061/242* (2013.01); *F16H 2061/247* (2013.01)

(56) References Cited

U.S. PATENT DOCUMENTS

| | | | | |
|---|---|---|---|---|
| 7,137,475 B2* | 11/2006 | Shiomi | ................. | F16H 59/105 180/315 |
| 8,322,245 B2* | 12/2012 | Kino | ....................... | F16H 59/10 74/473.12 |
| 8,607,657 B2* | 12/2013 | Haevescher | ............ | F16H 59/02 74/473.12 |
| 2010/0175494 A1* | 7/2010 | Schober | ................. | F16H 59/105 74/473.12 |
| 2010/0242656 A1 | 9/2010 | Kino | | |
| 2011/0138955 A1* | 6/2011 | Sickart | ................. | F16H 59/0204 74/473.3 |
| 2015/0068343 A1 | 3/2015 | Tokumo | | |
| 2016/0123460 A1 | 5/2016 | Tsukazaki | | |
| 2016/0215875 A1* | 7/2016 | Grennvall | ........... | F16H 59/0204 |

FOREIGN PATENT DOCUMENTS

| | | |
|---|---|---|
| EP | 2636926 A1 | 9/2013 |
| EP | 3054196 A1 | 8/2016 |
| FR | 2737160 A1 | 1/1997 |
| JP | H0926019 A | 1/1997 |
| JP | 2010-202083 A | 9/2010 |
| JP | 201127627 A | 2/2011 |
| JP | 5303434 B2 | 10/2013 |
| JP | 201558923 A | 3/2015 |
| JP | 2015123958 A | 7/2015 |

OTHER PUBLICATIONS

Office Action issued in the corresponding Japanese Application No. 2016-148380 dated Apr. 24, 2018, 6 pages.

* cited by examiner

SHIFT DEVICE

CROSS-REFERENCE TO RELATED APPLICATION

This application claims priority under 35 USC 119 from Japanese Patent Application No. 2016-148380 filed Jul. 28, 2016, the disclosure of which is incorporated by reference herein.

BACKGROUND

Field of the Invention

The present invention relates to a shift device in which a shift body is rotation operated to change a shift position of the shift body.

Related Art

In a shift device described in Japanese Patent Application Laid-Open (JP-A) No. 2010-202083, a gate block and a check block are disposed at a lower side of a shift lever, and a gate pin and a check portion of the shift lever respectively engage with the gate block and the check block to adjust rotation of the shift lever. Moreover, a position sensor detects a position of the shift lever.

Note that in this shift device, the position sensor is disposed at the lower side of the gate block and the check block.

SUMMARY

In consideration of the above circumstances, a shift device is obtained that is capable of achieving a reduction in size.

A shift device of a first aspect includes a shift body that is rotatably supported at a support portion, one end side of the shift body relative to the support portion being rotationally operable so as to change a shift position; an adjustment body that is disposed at another end side of the shift body relative to the support portion and at one side, relative to the shift body, in a predetermined direction, and that adjusts rotation of the shift body; and a detection section that is disposed at the another end side of the shift body relative to the support portion and at another side, relative to the adjustment body, in the predetermined direction, and that detects the shift position of the shift body.

A shift device of a second aspect is the shift device of the first aspect, wherein the adjustment body includes: an urging member that applies a rotational urging force to the shift body; and a guide member that guides rotation of the shift body, a position of a portion of the urging member and a position of a portion of the guide member being the same in the predetermined direction.

A shift device of a third aspect is the shift device of either the first aspect or the second aspect, wherein the shift body is communicated with the detection section at a portion of the detection section at the one side in the predetermined direction.

A shift device of a fourth aspect is the shift device of any one of the first aspect to the third aspect, further including: a first communicating portion that is provided at the shift body, and that actuates the detection section due to the shift body being rotated in a first direction such that the detection section detects the shift position of the shift body; and a second communicating portion that is provided at the shift body, and that actuates the detection section due to the shift body being rotated in a second direction such that the detection section detects the shift position of the shift body.

In the shift device of the first aspect, the shift body is rotatably supported by the support portion, and the shift position of the shift body is changed by the shift body being rotationally operated at the one end side of the shift body relative to the support portion (in a longitudinal direction of the shift body). The adjustment body is disposed at the another end side of the shift body relative to the support portion (in the longitudinal direction of the shift body), and the adjustment body adjusts rotation of the shift body. Moreover, the detection section is disposed at the another end side of the shift body relative to the support portion (in the longitudinal direction of the shift body), and the detection section detects the shift position of the shift body.

Note that the adjustment body is provided at the one side relative to the shift body in the predetermined direction (for example, the predetermined direction is a direction (substantially) perpendicular to the longitudinal direction of the shift body), and the detection section is disposed at the another side relative to the adjustment body in the predetermined direction. This thereby enables a reduction in size of the shift device.

In the shift device of the second aspect, the adjustment body includes the urging member and the guide member. The urging member applies a rotational urging force to the shift body, and the guide member guides rotation of the shift body.

Note that a position of a portion of the urging member and a position of a portion of the guide member are the same in the predetermined direction (in the predetermined direction, positions of the urging member and the guide member are the same). This thereby enables a reduction in size of the shift device in the predetermined direction.

In the shift device of the third aspect, the shift body is communicated with the detection section at a portion of the detection section at the one side in the predetermined direction. Accordingly, the shift body communicates with a portion on the adjustment body side of the detection section, thereby enabling a communication position of the shift body to the detection section to be brought closer to the adjustment body, and thus enabling the precision with which the shift position of the shift body is detected by the detection section to be raised.

In the shift device of the fourth aspect, the first communicating portion is provided at the shift body. When (due to that) the shift body is rotated in the first direction, the first communicating portion actuates the detection section such that the detection section detects the shift position of the shift body. Moreover, the second communicating portion is also provided at the shift body. When (due to that) the shift body is rotated in the second direction, the second communicating portion actuates the detection section such that the detection section detects the shift position of the shift body.

Accordingly, at least one out of the actuation precision of the detection section by the first connecting portion or the actuation precision of the detection section by the second connecting portion can be raised, thereby enabling the precision with which the shift position of the shift body is detected by the detection section to be raised.

BRIEF DESCRIPTION OF THE DRAWINGS

An exemplary embodiment will be described in detail with reference to the following figures, wherein.

DETAILED DESCRIPTION

Figure 1:
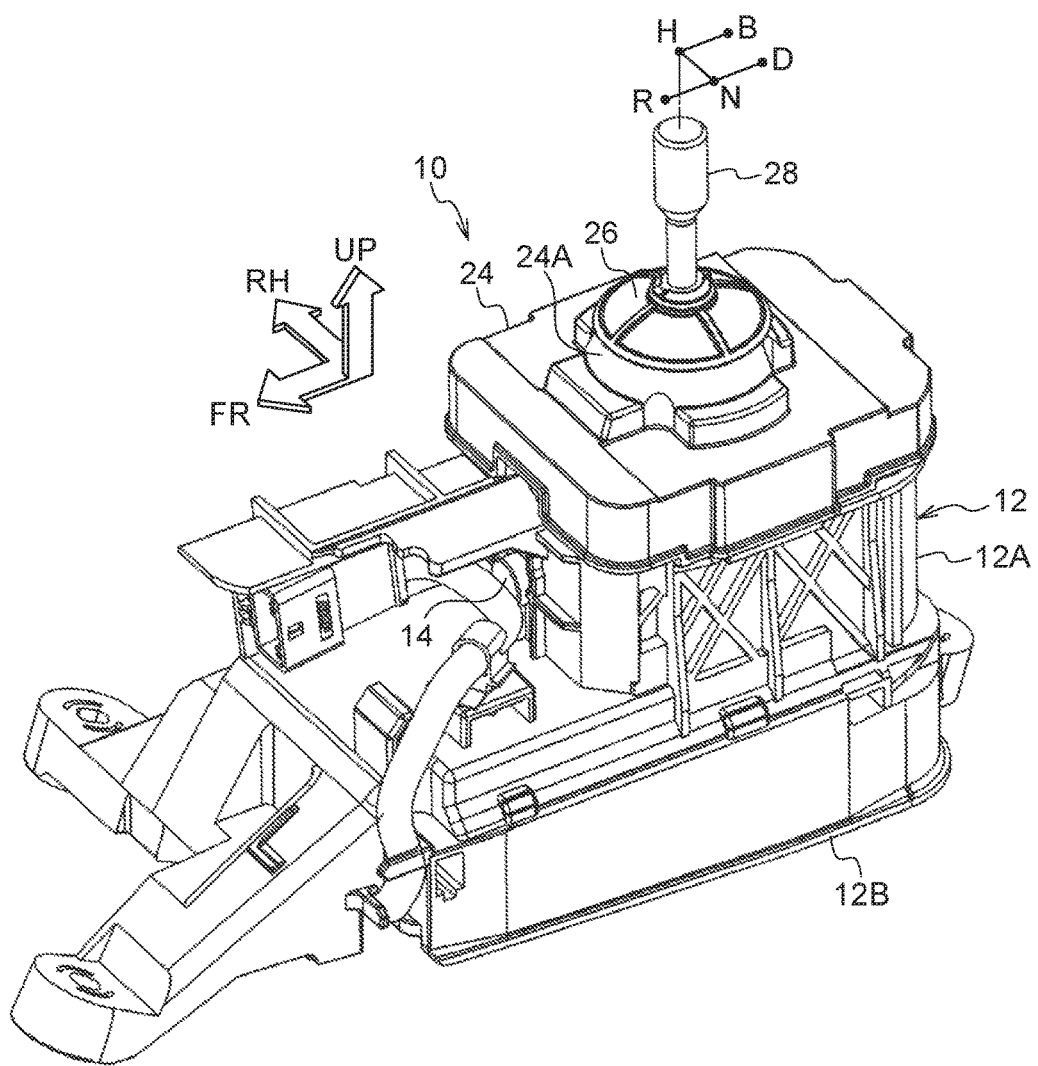
FIG. 1 is a perspective view illustrating a shift lever device according to an exemplary embodiment, as viewed from the oblique front left.
Figure 2:
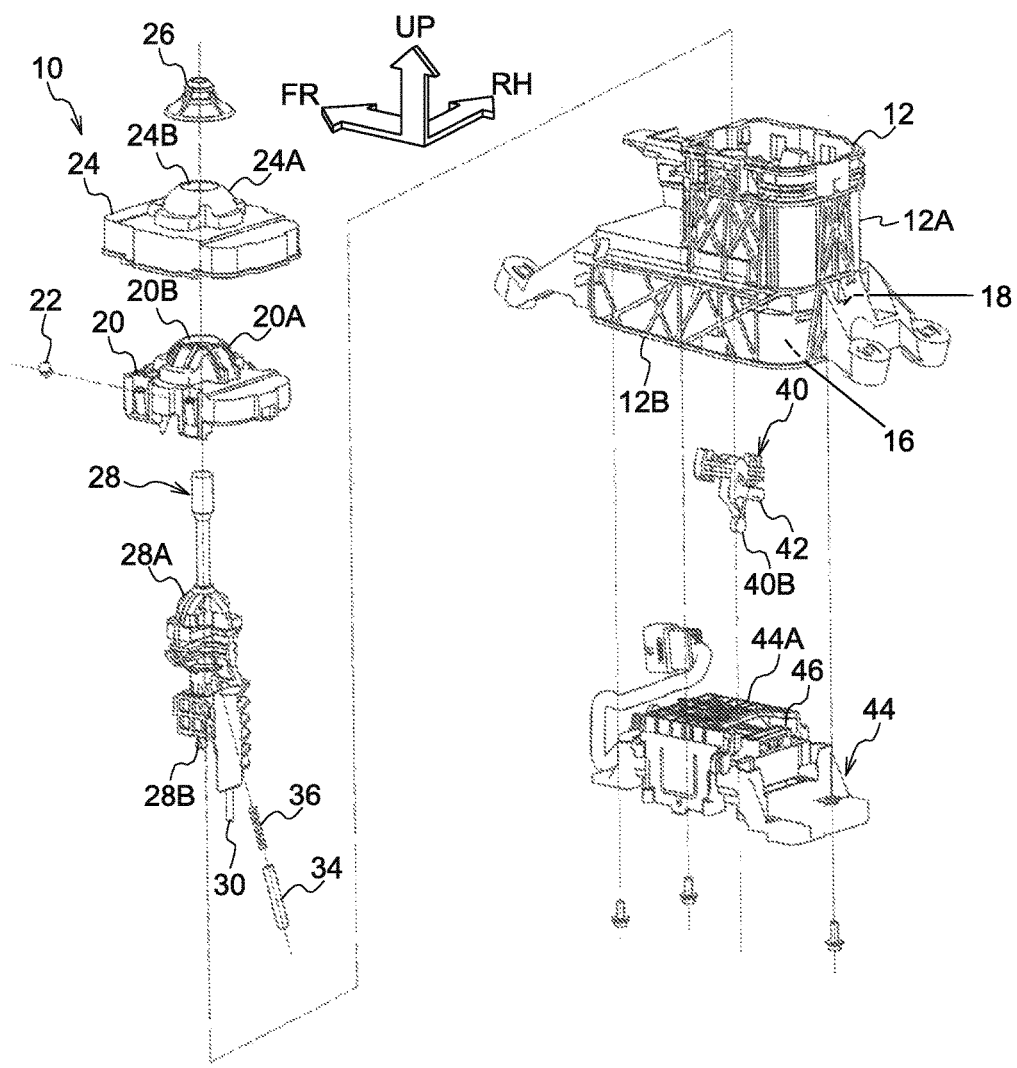
FIG. 2 is an exploded perspective view illustrating a shift lever device according to an exemplary embodiment, as viewed from the oblique rear left.

FIG. 1 is a perspective view illustrating a shift lever device 10, serving as a shift device according to an exemplary embodiment, as viewed from the oblique front left. FIG. 2 is an exploded perspective view illustrating the shift lever device 10 as viewed from the oblique rear left. Note that in the drawings, the arrow FR indicates a forward direction of the shift lever device 10, the arrow RH indicates a rightward direction of the shift lever device 10, and the arrow UP indicates an upward direction of the shift lever device 10.

The shift lever device 10 according to the present exemplary embodiment is a floor-mounted type installed to a vehicle width direction central portion of a floor section (vehicle body side) of a vehicle cabin of a vehicle (automobile). The forward direction, the leftward direction, and the upward direction of the shift lever device 10 are respectively oriented in a forward direction, leftward direction, and upward direction of the vehicle.

As illustrated in FIG. 1 and FIG. 2, the shift lever device 10 is provided with a plate 12 (housing) that is made from resin, that has a substantially tube shape, and that serves as an installation body. The plate 12 is installed (fixed) to the floor section of the vehicle cabin. A substantially rectangular tube shaped upper plate 12A, serving as a first installation portion, is provided at a rear side and upper side portion of the plate 12. The interior of the upper plate 12A is open toward the upper side. A lower plate 12B, that has a substantially rectangular tube shape and that serves as a second installation portion, is provided at a lower side portion of the plate 12. The interior of the lower plate 12B is open toward the lower side. A front side portion of the interior of the lower plate 12B is closed off at the upper side, and an upper side of a rear side portion of the interior of the lower plate 12B is in communication with the interior of the upper plate 12A.

Figure 3:
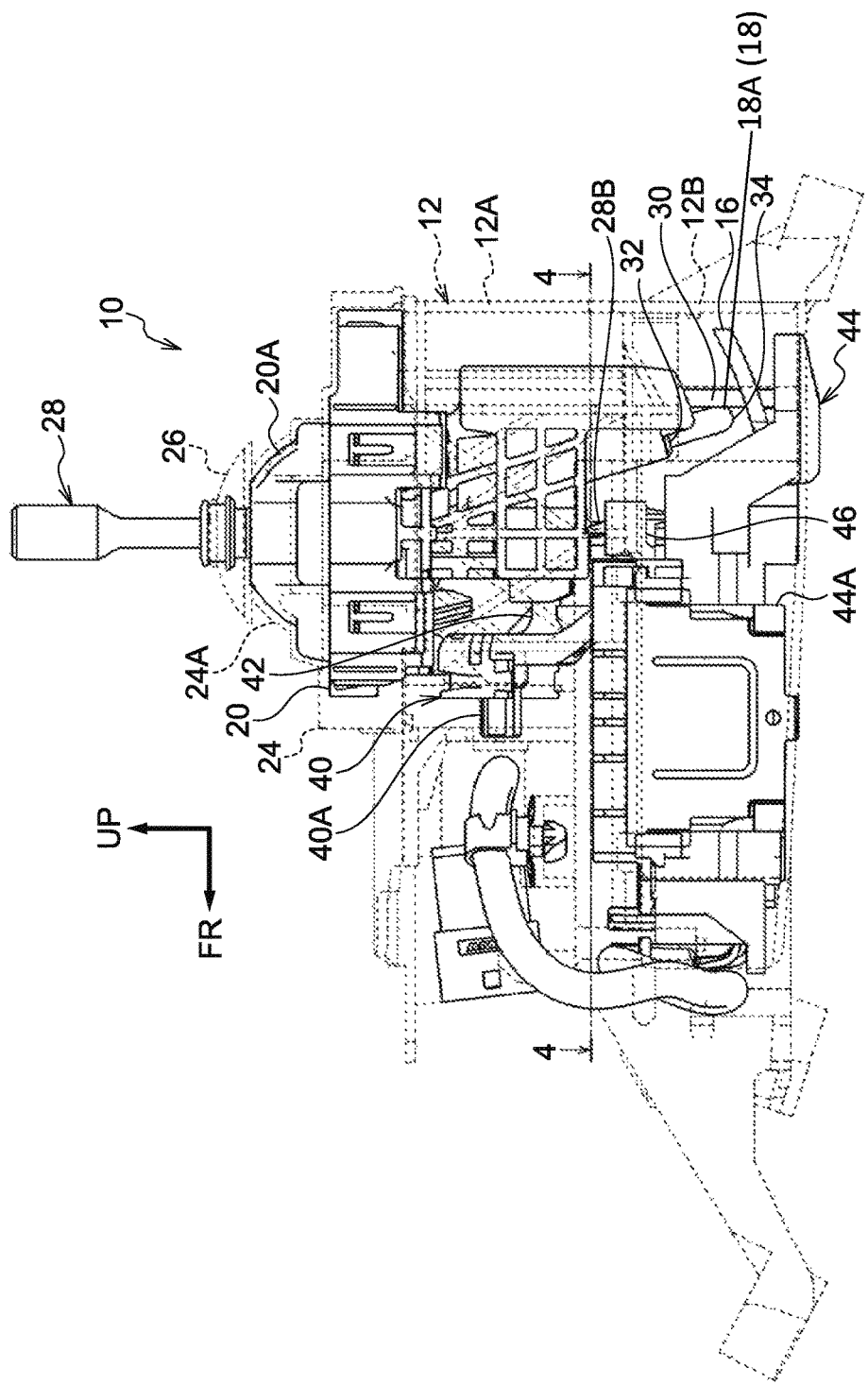
FIG. 3 is a side view illustrating a shift lever device according to an exemplary embodiment, as viewed from the left.
Figure 4:
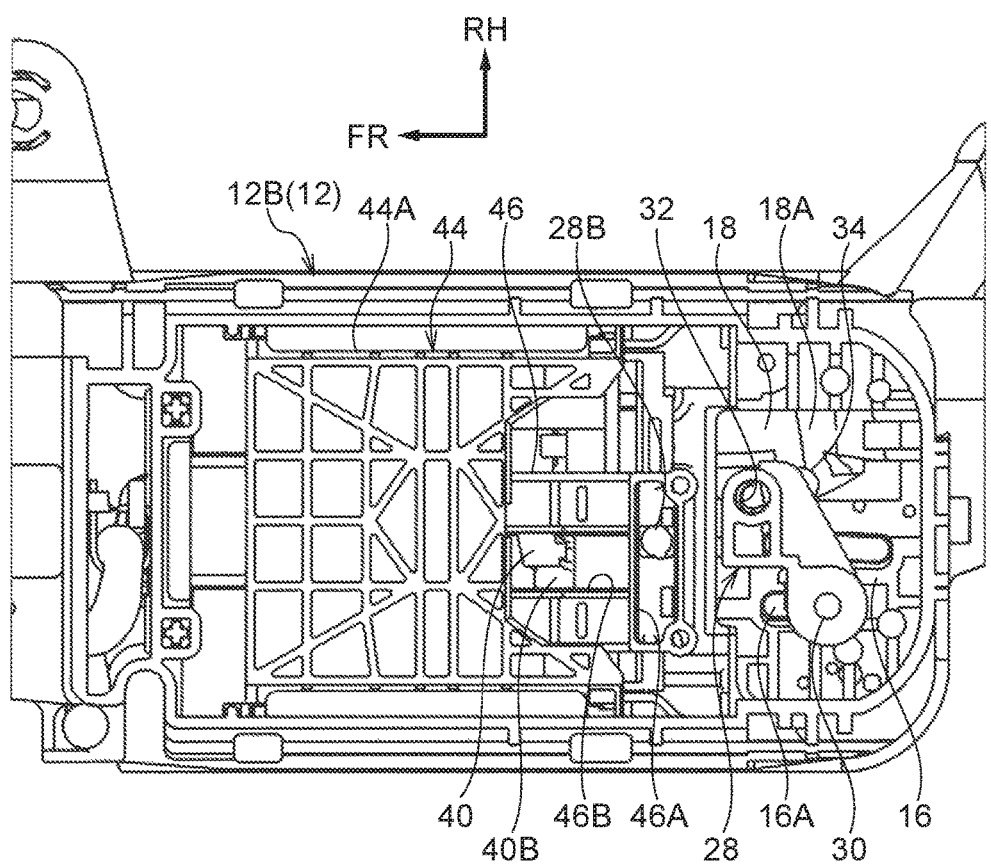
FIG. 4 is a cross-section (cross-section along line 4-4 in FIG. 3) illustrating a shift lever device according to an exemplary embodiment, as viewed from above.
Figure 5:
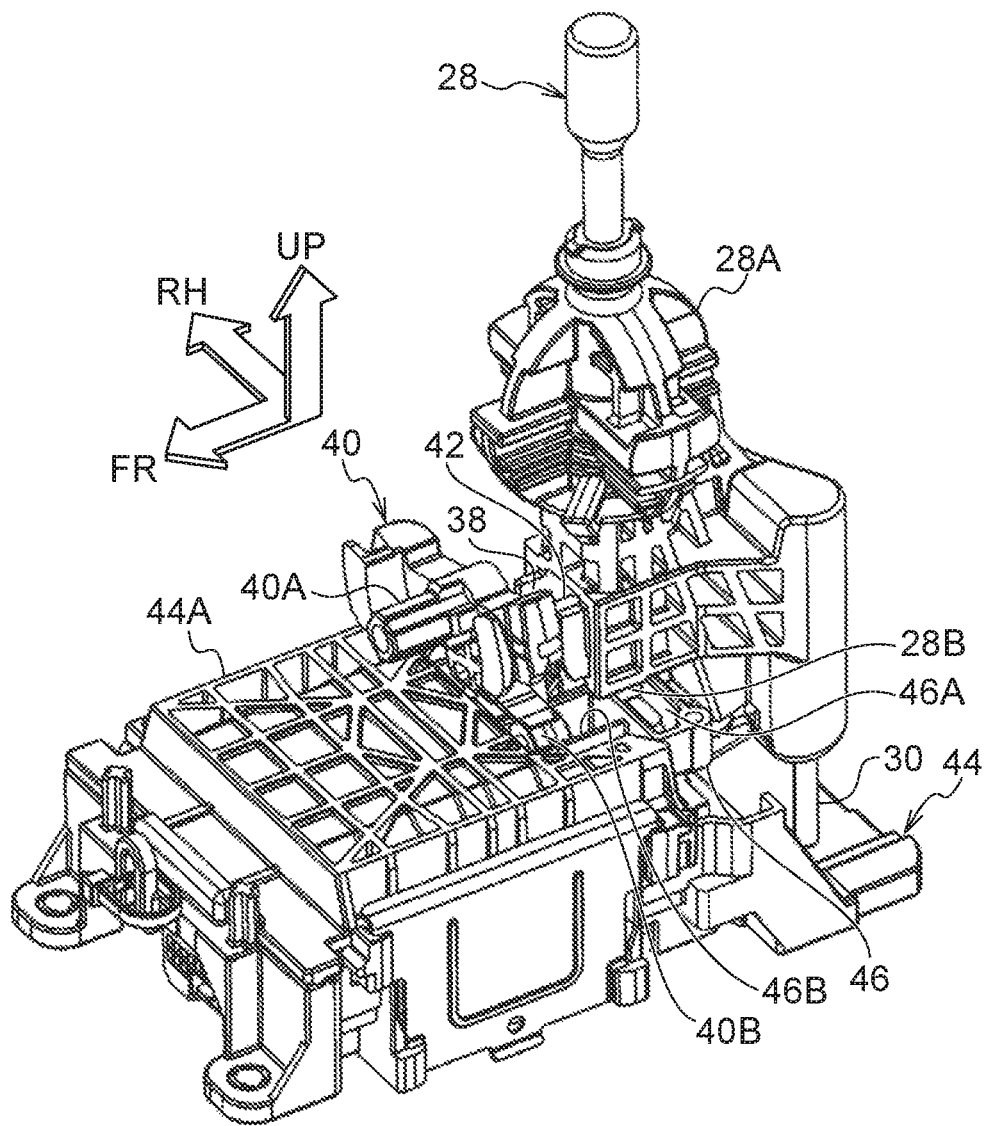
FIG. 5 is a perspective view illustrating relevant portions of a shift lever device according to an exemplary embodiment, as viewed from the oblique front left.
Figure 6:
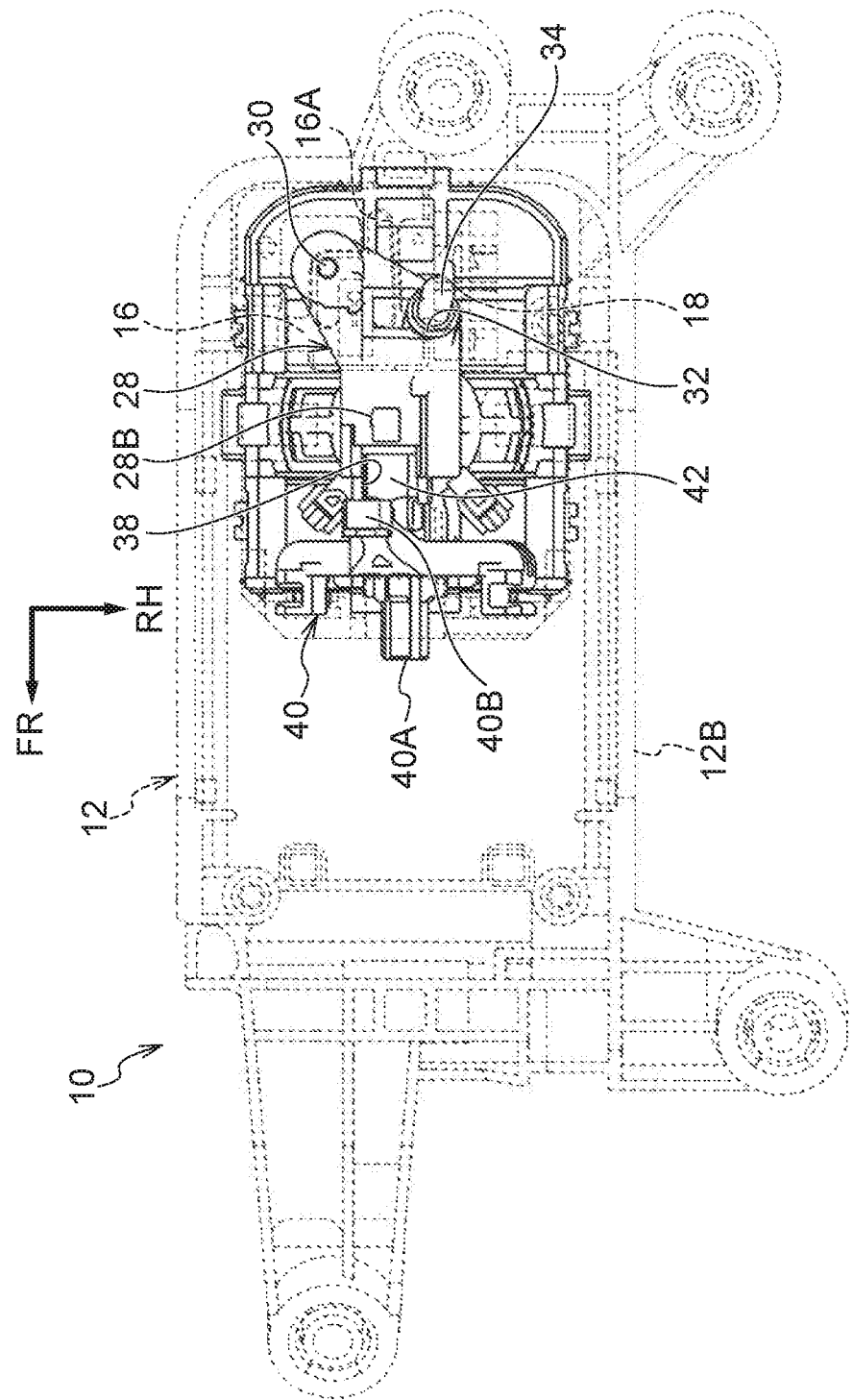
FIG. 6 is a lower face view of a shift lever device according to an exemplary embodiment, as viewed from below.

A support tube 14 with a bottomed tube shape and serving as an assembly portion is formed at a central portion of a front wall of the upper plate 12A. An axial direction of the interior of the support tube 14 is disposed parallel with the front-rear direction, and the support tube 14 is open toward the rear. A plate shaped gate plate 16 (see FIG. 3, FIG. 4, and FIG. 6), as a guide member (structuring an adjustment body), is integrally provided to a rear side and left side portion of the interior of the lower plate 12B. A gate hole (groove) 16A with a predetermined profile, serving as a guide hole, is formed penetrating the gate plate 16. A block shaped detent block 18 (see FIG. 4), serving as an urging member (structuring an adjustment body), is integrally provided to a rear side and right side portion of the interior of the lower plate 12B. An upper face of the detent block 18 configures a detent face 18A, and is formed as a face with a predetermined inclined face. The gate plate 16 (gate hole) and the detent block 18 (detent face 18A) are at least partially alongside one another in the left-right direction (a part of the gate plate 16 (gate hole) and a part of the detent block 18 (detent face 18A) are alongside one another in the left-right direction). Further, front-rear direction positions of the gate plate 16 (gate hole) and the detent block 18 (detent face 18A) are at least partially the same, and up-down direction positions of the gate plate 16 (gate hole) and the detent block 18 (detent face 18A) are at least partially the same (a front-rear direction position of a part of the gate plate 16 (gate hole) and a front-rear direction position of a part of the detent block 18 (detent face 18A) are the same, and an up-down direction position of a part of the gate plate 16 (gate hole) and an up-down direction position of a part of the detent block 18 (detent face 18A) are the same).

A seat 20 that is made from resin, that has a bottomed, substantially rectangular tube shape, and that serves as a support body is assembled to an upper side of the upper plate 12A. The interior of the seat 20 is open toward the lower side, such that the seat 20 covers the interior of the upper plate 12A from the upper side. An upper wall (bottom wall) of the seat 20 is formed with a substantially hemispherical frame shaped support frame 20A, serving as a retention portion. The interior of the support frame 20A is in communication with the interior of the seat 20. A circular insertion hole 20B is formed penetrating an upper portion of the support frame 20A, and the insertion hole 20B opens the interior of the support frame 20A toward the upper side. Substantially circular column shaped stoppers 22, serving as restriction portion, are respectively fixed to a left portion and a right portion of an inner side of a front wall of the seat 20. The stoppers 22 are made from rubber, and have elastic properties.

A first boot 24 that is made from rubber, that has a bottomed, substantially rectangular tube shape, and that serves as a first covering body is assembled to the upper side of the seat 20. The interior of the first boot 24 is open toward the lower side, and covers the seat 20 from the upper side. An upper wall (bottom wall) of the first boot 24 is formed with a substantially hemispherical frame shaped covering frame 24A, serving as a covering portion. The interior of the covering frame 24A is in communication with the interior of the first boot 24, and the covering frame 24A covers the support frame 20A of the seat 20 from the upper side. A circular communication hole 24B is formed penetrating an upper portion of the covering frame 24A. The communication hole 24B opens the interior of the covering frame 24A toward the upper side, and is in communication with the insertion hole 20B of the support frame 20A.

A second boot 26 that is made from rubber, that has a substantially conical tube shape, and that serves as a second covering body, is provided at an upper side of the first boot 24. The second boot 26 covers the communication hole 24B in the covering frame 24A of the first boot 24 from the upper side.

An elongated column shaped lever 28 that is made from a resin and that serves as a shift main body configuring a shift body is inserted through a rear side portion of the interior of the plate 12. An up-down direction (length direction, axial direction) intermediate portion of the lever 28 is provided with a substantially spherical support ball 28A, serving as a support portion. A peripheral face of the support ball 28A is configured with a substantially spherical face shape, and the support ball 28A is rotatably retained (supported) inside the support frame 20A of the seat 20. The lever 28 is thereby capable of rotating in the front-rear direction (shift direction, predetermined direction, first direction) and the left-right direction (select direction, second direction), centered on the support ball 28A.

A portion of the lever 28 at the upper side (one end side) relative to the support ball 28A (one end side portion of the lever 28 in a longitudinal direction of the lever 28) is inserted through the insertion hole 20B in the seat 20 (the support frame 20A), the communication hole 24B of the first boot 24 (the covering frame 24A), and the interior of the second boot 26. The lever 28 is capable of rotating with respect to the insertion hole 20B and the communication hole 24B, and is capable of rotating integrally (as a unit) together with the second boot 26. The lever 28 extends out to the upper side of the second boot 26, and an upper end portion of the lever 28 can be rotationally operated by a vehicle occupant (for example the driver).

A circular column shaped gate pin 30 (see FIG. 3 to FIG. 6), serving as a guide portion (structuring an adjustment portion), is integrally provided at a rear side and left side of a portion of the lever 28 at the lower side (another end side) relative to the support ball 28A (another end side portion of the lever 28 in the longitudinal direction of the lever 28). The gate pin 30 extends out toward the lower side. The gate pin 30 is inserted into (passes through) the gate hole of the gate plate 16 at the interior of the lower plate 12B of the plate 12. The gate pin 30 is guided by the gate hole 16A, so the gate plate 16 thereby guides (adjusts) rotation of the lever 28.

The lever 28 is disposed at an "H" position (home position), serving as a shift position. Rotation operating the lever 28 from the "H" position toward the rear side disposes the lever 28 at a "B" position (brake position), serving as a shift position. Rotation operating the lever 28 from the "H" position toward the left side (or toward the right side) disposes the lever 28 at an "N" position (neutral position), serving as a shift position. Moreover, rotation operating the lever 28 from the "N" position toward the front side disposes the lever 28 at an "R" position (reverse position), serving as a shift position, and rotation operating the lever 28 from the "N" position toward the rear side disposes the lever 28 at a "D" position (drive position), serving as a shift position.

A rear side and right side portion of the portion of the lever 28 at the lower side relative to the support ball 28A is formed with a circular column shaped detent hole (cavity) 32 (see FIG. 3, FIG. 4, and FIG. 6), serving as an urging hole. The detent hole 32 is closed off at an upper side, and is open at a lower side. A substantially circular column shaped detent pin 34 (see FIG. 3, FIG. 4, and FIG. 6), serving as an urging portion (structuring the adjustment portion), is fitted inside the detent hole 32. The detent pin 34 extends out toward the lower side. A detent spring 36 (compression coil spring), serving as an urging member, spans between an upper side face of the detent hole 32 and an upper side face of the detent pin 34. The detent spring 36 urges the detent pin 34 toward the lower side.

The detent pin 34 abuts (an upper face of) the detent face 18A of the detent block 18 inside the lower plate 12B of the plate 12 due to an urging force from the detent spring 36. Due to the urging force of the detent spring 36 and the incline of the detent face 18A, the detent block 18 applies the lever 28 with a rotational urging force, thereby adjusting the rotation of the lever 28. Due to the rotational urging force of the detent block 18, the lever 28 is disposed at the "H" position described above, such that in a state in which the lever 28 is disposed at a shift position other than the "H" position, when rotation operation force ceases to act on the lever 28, the lever 28 rotates under the rotational urging force of the detent block 18 so as to return to the "H" position.

The gate pin 30 and the detent pin 34 are at least partially alongside each other in the left-right direction (a part of the gate pin 30 and a part of the detent pin 34 are alongside each other in the left-right direction) (see FIG. 3), and front-rear direction positions and up-down direction positions of the gate pin 30 and the detent pin 34 are at least partially the same (a front-rear direction position of a part of the gate pin 30 and a front-rear direction position of a part of the detent pin 34 are the same, and an up-down direction position of a part of the gate pin 30 and an up-down direction position of a part of the detent pin 34 are the same).

The portion of the lever 28 at the lower side relative to the support ball 28A is integrally provided with a first joint portion 28B (see FIG. 3 to FIG. 6), serving as a first connecting (communicating) portion, at the front side of the gate pin 30 and the detent pin 34. The first joint portion 28B extends out toward the lower side, and a front face and rear face of a lower portion of the first joint portion 28B are curved so as to have convex profiles with respect to the up-down direction (line).

A front end portion of the portion of the lever 28 at the lower side relative to the support ball 28A is formed with a rectangular column shaped connecting hole (cavity) 38 (see FIG. 5 and FIG. 6) that serves as a connected (communicated) member. The connecting hole 38 is open at a front side and at a lower side.

A select link 40 (see FIG. 3 to FIG. 6) that is made from resin, and that serves as a connecting (communicating) member configuring the shift body is disposed at a front side of the portion of the lever 28 at the lower side relative to the support ball 28A. The select link 40 has a T-shaped profile as viewed face-on (as viewed along the front-rear direction). A substantially circular column shaped rotation shaft 40A is integrally provided at a left-right direction center of an upper portion of the select link 40. The rotation shaft 40A projects out toward the front. The rotation shaft 40A is fitted coaxially inside the support tube 14 in the front wall of the upper plate 12A of the plate 12. The select link 40 is capable of rotating about the front-rear direction, centered on the rotation shaft 40A. A left side portion of the select link 40 is capable of elastically abutting the left side stopper 22 of the seat 20 at being rotated toward the upper side, and a right side portion of the select link 40 is capable of elastically abutting the right side stopper 22 of the seat 20 at being rotated toward the upper side, thereby defining a rotation range of the select link 40.

An upper part of a lower side portion of the select link 40 (at the lower side of the rotation shaft 40A) is integrally provided with a substantially circular column shaped connecting (communicating) projection 42, serving as a connecting (communicating) portion. The connecting projection 42 projects out toward the rear. A left face and right face of a rear portion (leading end side portion) of the connecting projection 42 are curved so as to have convex profiles with respect to the up-down direction, and the rear portion of the connecting projection 42 is inserted into the connecting hole 38 in the lever 28. The rear portion of the connecting projection 42 is fitted together with the connecting cavity 38 in the left-right direction, and in a rotation operation of the lever 28 toward the left side or the right side, the connecting hole 38 and the connecting projection 42 are rotated toward the right side or the left side respectively, and a lower side portion of the select link 40 is rotated toward the right side or the left side. Moreover, in a rotation operation of the lever 28 toward the front side or the rear side, the connecting hole 38 is respectively rotated toward the rear side or the front side with respect to the connecting projection 42, and the rotation position of the lower side portion of the select link 40 is maintained.

A lower end portion of the select link 40 is formed with a second joint portion 40B, serving as a second connecting (communicating) portion. A left face and a right face of the second joint portion 40B are curved so as to have convex profiles with respect to the up-down direction. When the lever 28 is disposed at the center of its left-right direction rotation range, a position of the left-right direction center of the second joint portion 40B and a position of the left-right direction center of the lower portion of the first joint portion 28B of the lever 28 are the same in the left-right direction.

A sensor unit 44 (see FIG. 3 to FIG. 5), serving as a detecting body, is fixed inside the lower plate 12B of the plate 12. At a portion of the sensor unit 44 other than a rear portion, the sensor unit 44 is provided with a substantially rectangular block shaped sensor mechanism 44A, serving as a detection section. The sensor mechanism 44A is disposed at the front side of the gate plate 16 and the detent block 18 at the interior of the lower plate 12B, and at the front side of the gate pin 30 and the detent pin 34 of the lever 28.

An upper end portion of the sensor mechanism 44A is provided with an operation member 46 that serves as a connected (communicated) member and that has a rectangular shape in plan view. An upper wall of the sensor mechanism 44A is disposed at the upper side of a front side portion of the operation member 46, and a rear side portion of the operation member 46 is open toward the upper side.

A first operation groove 46A that has a rectangular cross-section profile and that serves as a first connected (communicated) portion is formed at a rear end portion of the operation member 46. The first operation groove 46A extends in the left-right direction. The first operation groove 46A is open toward the upper side, and the lower portion of the first joint portion 28B of the lever 28 is inserted into (communicated with (connected to)) the first operation groove 46A so as to be fitted thereto in the front-rear direction. In a rotation operation of the lever 28 toward the front side or the rear side, the lower portion of the first joint portion 28B is rotated toward the rear side or the front side respectively, such that the operation member 46 respectively moves (slides) toward the rear side or the front side. In a rotation operation of the lever 28 in the left-right direction, the first operation groove 46A is permitted to move in the left-right direction with respect to the lower portion of the first joint portion 28B, thereby permitting movement (sliding) of the operation member 46 in the left-right direction.

A second operation groove 46B that has a rectangular cross-section profile and that serves as a second connected (communicated) portion is formed at a rear side portion of the operation member 46, at the front side of a left-right direction central portion of the first operation groove 46A. The second operation groove 46B extends in the front-rear direction. The second operation groove 46B is open toward the upper side, and the second joint portion 40B of the select link 40 is inserted into (communicated with (connected to)) the second operation groove 46B so as to be fitted thereto in the left-right direction. In a rotation operation of the lever 28 toward the left side or the right side, the second joint portion 40B is rotated toward the right side or the left side respectively, such that the operation member 46 moves (slides) toward the right side or the left side. In a rotation operation of the lever 28 in the front-rear direction, the second operation groove 46B is permitted to move in the front-rear direction with respect to the second joint portion 40B, thereby permitting movement (sliding) of the operation member 46 in the front-rear direction.

A magnet (not illustrated in the drawings), serving as a detected portion, is fixed to a front side portion of the operation member 46. The magnet moves in the front-rear direction and the left-right direction together integrally (as a unit) with the operation member 46, and the magnet generates magnetic force.

A sensor substrate (not illustrated in the drawings), serving as a detection portion, is fixed inside the sensor mechanism 44A at a lower side of the magnet. The sensor substrate faces the magnet of the operation member 46. The sensor substrate is capable of detecting the magnetic force generated by the magnet, thus detecting the position of the magnet in the front-rear direction and the left-right direction, and thereby detecting the position of the operation member 46 in the front-rear direction and the left-right direction.

Next, explanation follows regarding operation of the present exemplary embodiment.

In the shift lever device 10 configured as described above, the gate plate 16 and the detent block 18 of the plate 12 (lower plate 12B) are disposed at the lower side of the support ball 28A of the lever 28. The gate pin 30 of the lever 28 is guided by the gate hole of the gate plate 16, such that the rotation of the lever 28 is guided by the gate plate 16. The detent pin 34 of the lever 28 abuts the detent face 18A of the detent block 18 due to the urging force of the detent spring 36, such that the detent block 18 applies a rotational urging force to the lever 28.

Moreover, the sensor unit 44 is disposed at the lower side of the support ball 28A of the lever 28, and the first joint portion 28B of the lever 28 and the second joint portion 40B of the select link 40 are connected (communicated) to the operation member 46 of the sensor mechanism 44A of the sensor unit 44. In a rotation operation of the lever 28 in the front-rear direction, the first joint portion 28B of the lever 28 is rotated in the front-rear direction such that the operation member 46 moves in the front-rear direction. On the other hand, in a rotation operation of the lever 28 in the left-right direction, the connecting hole 38 of the lever 28 and the connecting projection 42 of the select link 40 are rotated in the left-right direction, thereby rotating the second joint portion 40B of the select link 40 in the left-right direction, and moving the operation member 46 in the left-right direction. Moreover, the position of the magnet of the operation member 46 in the front-rear direction and the left-right direction is detected by the sensor substrate of the sensor mechanism 44A so as to detect the position of the operation member 46 in the front-rear direction and the left-right direction, and thereby detect the shift position of the lever 28.

Note that the gate plate 16 and the detent block 18 are disposed at the rear side (at one side in the predetermined direction) of the lever 28, and the sensor mechanism 44A is disposed at the front side (at another side in the predetermined direction) of the gate plate 16 and the detent block 18. This thereby enables a reduction in size of the shift lever device 10 in the up-down direction, unlike in a configuration in which the sensor mechanism 44A is disposed at the lower side of the gate plate 16 and the detent block 18.

Moreover, the gate pin 30 and the detent pin 34 are provided at the rear side of the lever 28, and the sensor mechanism 44A is disposed at the front side of the gate pin 30 and the detent pin 34. This thereby enables a further reduction in size of the shift lever device 10 in the up-down direction, unlike in a configuration in which the sensor mechanism 44A is disposed at the lower side of the gate pin 30 and the detent pin 34.

Moreover, the front-rear direction positions of the gate plate 16 and the detent block 18 are at least partially the same. This thereby enables a reduction in size of the shift lever device 10 in the front-rear direction.

Moreover, the front-rear direction positions of the gate pin 30 and the detent pin 34 are at least partially the same. This thereby enables a further reduction in size of the shift lever device 10 in the front-rear direction.

Moreover, the first operation groove 46A and the second operation groove 46B of the operation member 46 are disposed at a rear end portion of the sensor mechanism 44A. The first joint portion 28B of the lever 28 and the second joint portion 40B of the select link 40 are respectively connected (communicated) to the first operation groove 46A and the second operation groove 46B. Accordingly, since the first joint portion 28B and the second joint portion 40B are connected (communicated) to an end portion, on the gate plate 16 and detent block 18 side, of the sensor mechanism 44A, the connection (communication) positions of the first joint portion 28B and the second joint portion 40B to the sensor mechanism 44A can be brought closer to the gate plate 16 and the detent block 18. Accordingly, the positions of the first joint portion 28B and the second joint portion 40B that are for detecting the rotation position of the lever 28, and the positions of the gate plate 16 and the detent block 18 that adjust the rotation position of the lever 28 can be brought closer together, thereby enabling the precision with which the positions of the first joint portion 28B and the second joint portion 40B correspond to the shift positions of the lever 28 to be raised, and thereby enabling the precision with which the shift positions of the lever 28 are detected by the sensor mechanism 44A to be raised.

Moreover, the first joint portion 28B that rotates in the front-rear direction in a front-rear direction rotation operation of the lever 28, and the second joint portion 40B that rotates in the left-right direction in a left-right direction rotation operation of the lever 28, are provided separately to one another. Accordingly, a preferable fit in the front-rear direction can be achieved between the lower portion of the first joint portion 28B and the first operation groove 46A of the operation member 46, thereby enabling front-rear direction movement of the first joint portion 28B to move the operation member 46 with good precision in the front-rear direction. Moreover, a preferable fit in the left-right direction can be achieved between the second joint portion 40B and the second operation groove 46B of the operation member 46, thereby enabling left-right direction movement of the second joint portion 40B to move the operation member 46 with good precision in the left-right direction. This thereby enables the positional precision of movement of the operation member 46 in the front-rear direction and/or in the left-right direction as a result of rotation operation of the lever 28 in the front-rear direction and/or in the left-right direction to be raised, thereby enabling the precision with which the shift position of the lever 28 is detected by the sensor mechanism 44A to be raised further.

Moreover, the second joint portion 40B of the select link 40 is disposed at the outside of a rotation radial direction of the select link 40 relative to the connecting hole 38 of the lever 28 (the connecting projection 42 of the select link 40). Accordingly, in a rotation operation of the lever 28 in the left-right direction, a rotation stroke of the second joint portion 40B of the select link 40 is enlarged with respect to (in comparison to) a left-right direction rotation stroke of the connecting hole 38 in the lever 28 (connecting projection 42 of the select link 40), thereby increasing a left-right direction movement stroke of the operation member 46. This thereby enables a large movement stroke of the operation member 46 as a result of rotating the lever 28 between shift positions in the left-right direction, even if the lever 28 has only a small rotation angle and small rotation stroke between shift positions in the left-right direction. The precision with which the shift position of the lever 28 in the left-right direction is detected by the sensor mechanism 44A can accordingly be raised.

Moreover, the select link 40 is disposed at the operation member 46 side (front side) of the lever 28. This thereby enables the connection (communication) distance in the front-rear direction between the lever 28 (connecting hole 38) and the operation member 46 (second operation groove 46B) by the select link 40 (separation distance in the front-rear direction between the rear portion of the connecting projection 42 and the second joint portion 40B of the select link 40) to be made small. This thereby enables the precision of the left-right direction rotation position of the second joint portion 40B as a result of left-right direction rotation operation of the lever 28 to be raised, and thereby enables the precision with which the shift position of the lever 28 in the left-right direction is detected by the sensor mechanism 44A to be raised further.

Note that in the present exemplary embodiment, the gate plate 16 and the detent block 18 are disposed at the rear side of the lever 28, and the sensor mechanism 44A is disposed at the front side of the gate plate 16 and the detent block 18. However, it is sufficient that the gate plate 16 and the detent block 18 be disposed at one side of the lever 28 in a predetermined direction (for example, at the front side, at the left side, or at the right side thereof), and that the sensor mechanism 44A be disposed at another side of the gate plate 16 and the detent block 18 in the predetermined direction (for example, at the rear side, the right side, or the left side thereof).

Moreover, in the present exemplary embodiment, the gate pin 30 and the detent pin 34 are provided at the rear side of the lever 28, and the sensor mechanism 44A is disposed at the front side of the gate pin 30 and the detent pin 34. However, it is sufficient that the gate pin 30 and the detent pin 34 be provided at one side of the lever 28 in a predetermined direction (for example, at the front side, at the left side, or at the right side thereof), and that the sensor mechanism 44A be disposed at another side of the gate pin 30 and the detent pin 34 in the predetermined direction (for example, at the rear side, at the right side, or at the left side thereof).

Moreover, in the present exemplary embodiment, the lever 28 and the select link 40 are configured by separate members. However, the lever 28 and the select link 40 may be configured by a single member.

Moreover, in the present exemplary embodiment, the gate pin 30 is provided on the lever 28 side, and the gate plate 16 is provided on the plate 12 side. However, the gate plate 16 (guide portion) may be provided on the lever 28 side, and the gate pin 30 (guide member) may be provided on the plate 12 side.

Moreover, in the present exemplary embodiment, the detent hole 32, the detent spring 36, and the detent pin 34 are provided on the lever 28 side, and the detent block 18 is provided on the plate 12 side. However, the detent block 18 (urging portion) may be provided on the lever 28 side, and the detent hole 32, the detent spring 36, and the detent pin 34 (urging member) may be provided on the plate 12 side.

Moreover, in the present exemplary embodiment, the shift lever device 10 is a floor-mounted type installed to the floor section of the vehicle cabin. However, the shift lever device 10 may be installed to an instrument panel or a steering column of the vehicle cabin.

What is claimed is:

1. A shift device configured to be installed in a vehicle, comprising:
    an elongated shift body that is rotatably supported at a support portion, an upper end side of the shift body above the support portion in a longitudinal direction of the shift body being rotationally operable so as to change a shift position;
    an adjustment body that adjusts rotation of the shift body, and that includes an urging member applying an urging force to the shift body and a guide member guiding rotation of the shift body, the urging member and the guide member being is disposed at a lower end side of the shift body below the support portion in the longitudinal direction of the shift body and being disposed at one side of the shift body, along a front-rear direction of a vehicle; and
    a detection section that is disposed at the lower end side of the shift body below the support portion in the longitudinal direction of the shift body and is completely disposed on one side of urging member and the guide member, along the front-rear direction of the vehicle, and that detects the shift position of the shift body,
    wherein the urging member and the guide member are disposed alongside one another in the front-rear direction of the vehicle such that a part of the urging member and a part of the guide member overlap along a right-left direction of the vehicle, and
    the detection section detects the shift position of the shift body both in the front-rear and the right-left direction of the vehicle.

2. The shift device of claim 1, wherein the detection section includes an operation member that is movable with respect to the detection section in both the vehicle front-rear direction and vehicle right-left direction, and further comprising: a first connecting portion that is provided at the shift body, that connects with a first portion of the operation member of the detection section and moves the operation member in the vehicle front-rear direction, the first portion being at one side in the vehicle front-rear direction of the detection section, and that actuates the detection section due to the shift body being rotated in a first direction such that the detection section detects the shift position of the shift body; and a second connecting portion that connected to a same side of the shift body as the first connecting portion, and that connects with a second portion of the operation member of the detection section and moves the operation member in the vehicle left-right direction, the second portion being also at the one side in the vehicle front-rear direction of the detection section, and that actuates the detection section due to the shift body being rotated in a second direction such that the detection section detects the shift position of the shift body.

* * * * *